United States Patent [19]

Glaser et al.

[11] Patent Number: 4,534,949
[45] Date of Patent: Aug. 13, 1985

[54] PROCESS FOR THE MANUFACTURE OF MOLDED CARBON BODIES

[75] Inventors: Herbert Glaser, Gladbeck; Konrad Stolzenberg, Waltrop, both of Fed. Rep. of Germany

[73] Assignee: Rutgerswerke Aktiengesellschaft, Frankfurt am Main, Fed. Rep. of Germany

[21] Appl. No.: 626,091

[22] Filed: Jun. 29, 1984

Related U.S. Application Data

[63] Continuation of Ser. No. 388,006, Jun. 14, 1982, abandoned.

[30] Foreign Application Priority Data

Jun. 30, 1981 [DE] Fed. Rep. of Germany ....... 3125609

[51] Int. Cl.$^3$ .............................................. C01B 31/02
[52] U.S. Cl. ................................ 423/445; 423/448; 423/449; 264/29.1; 264/29.5; 264/29.7
[58] Field of Search ........... 423/445, 448, 449; 264/29.1, 29.5, 29.7

[56] References Cited

U.S. PATENT DOCUMENTS

| | | | |
|---|---|---|---|
| 3,558,276 | 1/1971 | Otani | 423/449 |
| 4,016,247 | 4/1977 | Otani et al. | 423/449 X |
| 4,032,430 | 6/1977 | Lewis | 423/447.1 |
| 4,071,604 | 1/1978 | Schwemer | 423/445 |
| 4,115,527 | 9/1978 | Otani et al. | 423/447.4 |
| 4,184,942 | 1/1980 | Angier et al. | 423/447.1 |
| 4,190,637 | 2/1980 | Kennedy | 423/448 |
| 4,219,404 | 8/1980 | Dickakian | 423/447.1 |
| 4,379,133 | 4/1983 | Zander et al. | 423/445 |

*Primary Examiner*—William R. Dixon
*Assistant Examiner*—Steven Capella
*Attorney, Agent, or Firm*—Beveridge, DeGrandi & Weilacher

[57] ABSTRACT

A process for the manufacture of molded carbon bodies directly from high-boiling aromatic hydrocarbon fractions derived from coal or mineral oil, without additional binding agents and without using high pressures, is disclosed. Molds are filled with the starting material, distillation residues from the working-up of coal tar or pyrolysis products, these residues having a softening point (KS) in excess of 40° C. and a quinoline-insoluble content (QI)<1.0%, and being in the liquid state, or in the solid state, and are heated, in the first step up to 550° C., the residues being converted into "green" coke. In the second step, the coke is heated up to at least 800° C. at a heating rate, depending on the diameter d (m), of $1.2 \times 1/d^2$ K/day. The molded bodies can be impregnated and graphitized. They are distinguished by high electrical conductivity, low thermal expansion, and high strength in the axial direction.

11 Claims, No Drawings

PROCESS FOR THE MANUFACTURE OF MOLDED CARBON BODIES

This is a continuation of our copending application Ser. No. 388,006 filed June 14, 1982, now abandoned, which is relied on and incorporated herein by reference.

The invention relates to a process for the manufacture of molded carbon bodies without additional binding agents.

In industry, molded carbon bodies of this type are employed as anodes for the chlor-alkali electrolysis process, as anode-blocks for the production of aluminum, as electrodes for electric arc furnaces in steel plants, and as molded components in mechanical engineering and chemical engineering, as well as in electrical technology.

Quality characteristics for carbon bodies are: true density, apparent density, strength values, resistance to elevated temperatures, electrical conductivity, thermal expansion, porosity, microstructure and trace-element contents, these characteristics having different weighings according to the particular application.

Molded bodies of this type are manufactured from cokes and binding agents, according to the technology customary at the present time, by mixing, molding and burning. In general, the coke is a calcined petroleum coke, and/or a partially calcined pitch coke. Petroleum pitches and coal tar pitches with a softening point of approximately 100° C. are used as binding agents. In order to obtain high densities, the molded bodies must be impregnated and reburned up to three times, depending on the particular application, before they can be machined to their final dimensions.

Processes for manufacturing molded bodies without the addition of binding agents are also described in the literature.

According to German Offenlegungsschrift No. 2,035,395, a carbonizable material containing between 8 and 10% of volatile constituents is recommended as the precursor for the manufacture of molded bodies. Carbonizable materials with residual-volatile contents of this order of magnitude are generally "green" cokes, which have been produced at temperatures in the region of 500° C.

The "green" coke is comminuted in the cold state, and is afterwards subjected to a compression treatment at pressures between 1 and $4 \times 10^3$ bar, within a temperature range of a suitable plasticity, preferably between 350° and 450° C.

After removal from the mold, coking is carried out at temperatures of up to a maximum in excess of 1000° C.

In order to avoid the formation of cracks in the molded body, small temperature gradients must be chosen in the ranges over which significant amounts of gas are evolved, between 300° and 500° C., and between 600° and 800° C. After the graphitization treatment at 2500° to 3000° C., during which the coke is converted into graphite, the molded bodies possess, in the most favorable case, a porosity of approximately 25%. In addition to the density of the body this porosity is an important quality characteristic.

A similar process for the manufacture of molded bodies based on a pitch extract is described in British Patent Specification No. 1,416,573. Pitches, which have first been heat-treated and have mesophase contents of 9.5 to 25%, are separated, using organic solvents such as quinoline, pyridine, or tar oils, into a phase which can be graphitized, composed of disperse mesophase spherolites, and a pitch phase which cannot be graphitized. The mesophase spherolites have diameters ranging from 1 to 100 μm and are still encased by approximately 10% of isotropic pitch.

If the separation of the pitch is thorough, a pulverulent coke material is obtained after the coking treatment, this material being amenable to further processing, using suitable binders, to produce quasi-isotropic molded bodies. If the pitch contents are relatively high, the direct manufacture of molded bodies is possible, even without additional binding agents, because the residual pitch takes over this function. Densities of between 1.34 and 1.72 g/cm$^3$ can be obtained in the molded bodies.

Both the processes described above require that the starting material be subjected to an expensive pretreatment procedure, which results in these processes being of no interest with regard to their economical exploitation for mass-production items.

A simplified process for the manufacture of carbon bodies from pitch-like hydrocarbon substances, without the additional use of binding agents, is described in the Japanese Periodical "Tanso" 1968, Issue 52, Pages 13-17.

According to this process, a modified hard pitch, with a softening point in excess of 170° C., is comminuted and mixed with 5 to 6 times the quantity of a water/ethanol mixture, to produce a slip (slurry), a ball mill being used for this purpose. This slip is poured into a pre-manufactured plaster mold, according to a method identical to the technique known from the porcelain industry. The water soaks into the plaster, leaving a layer of finely-dispersed pitch which has a thickness not exceeding 5 mm and which detaches itself from the mold.

Before the "green" molded bodies are stabilized they can be subjected to a pressure treatment, which increases the density of the finished coke body, and reduces its porosity. The stabilization of the "green" molded pitch body is effected by a treatment which renders it infusible in an ozone atmosphere, at temperatures in the region of the softening point. After the subsequent carbonizing treatment, molded bodies with porosities of between 50% and 90% and body densities of between 1.45 and 0.75 g/cm$^3$ are obtained.

In the case of this process, as well, a low heating rate is recommended during the phase corresponding to the sintering of the individual particles, in order to avoid deformations in the body caused by increased degassing rates. The microstructure of a molded body, manufactured by this method, is isotropic, and its other physical properties are very markedly dependent on the technique used for producing the modified hard pitch, such as, for example, distillation or air-blowing.

The object of the invention is to manufacture anisotropic molded carbon bodies, in large sizes, directly from high-boiling aromatic hydrocarbon fractions derived from coal or mineral oil and having a high coking residue, in a simple manner, avoiding the intermediate stages and without using high pressures.

The object was achieved, according to the invention, when molds are filled with hydrocarbon fractions having a softening point in excess of 40° C. (Krämer-Sarnow), these hydrocarbon fractions being in the liquid state or the solid state, and are heated, in the first step, until the hydrocarbons are completely converted into "green" coke, up to a maximum of 550° C., and are thereafter heated, in a second step, up to approximately 800° C., at a linear heating rate of approximately $$1.2 \times (1/d^2) \text{°K./day,}$$

which is a function of the diameter d (m) of the molded body, and when the molded body, manufactured in this manner, is burned at a temperature of not less than 850° C., is removed from the mold and graphitized, a single or repeated impregnation treatment using pitch being carried out before burning, if appropriate.

Hydrocarbon fractions with a content of constituents which are insoluble in quinoline which does not exceed 1% are preferably used as the raw material, these hydrocarbon fractions being obtained, as a distillation residue, during the working-up of coal tar, or from highly aromatic residues from the steam-cracking of mineral oil fractions. Hard pitches having a softening point (KS) in excess of 100° C. are particularly suitable for this purpose.

A shrinkage dimension of 5% must be taken into account, in order to ensure that the molded body conforms to the required dimensions.

The first heating step comprises two stages. In the first stage, the hard pitch, which has been introduced into the molds, is heated to the temperature at which the formation of the mesophase commences.

In the subsequent, second stage, inter-molecular forces cause, as heating continues to higher temperatures, anisotropically deformable liquid crystals to form from the isotropic molten pitch, these liquid crystals being the so-called mesophase. During a further, rapid rise in temperature, the mesophase solidifies, forming "green" coke. During the coking of the mesophase to form "green" coke, cracking products arise as a result of the condensation reactions, these products escaping as bubbles of gas or vapor through the anisotropic mesophase which is gradually solidifying. At their phaseboundaries with the mesophase, the rising bubbles generate shear stresses, which impress an needlelike texture on the mesophase, in the direction of the rising bubbles. The more rapid the heating and, consequently, the degassing is carried out, the greater this shaping force becomes. In the case of a cylindrical mold, standing vertically, the bubbles rise in the axial direction. After the graphitizing treatment, the highest strength values and the best electrical conductivity values are obtained in this orientation direction. Under a thermal stress, no internal stresses occur in the axial direction of the molded body, since the solidified mesophase possesses a virtually identical orientation over the entire volume of the molded body.

If desired, an impregnation treatment can be carried out before the molded body is removed from its mold. According to the process to which the invention relates, this treatment can be carried out in one step, or in several steps. To carry out this treatment, the impregnating pitch is preferably poured onto the surface of the porous molded coke body, which has solidified in the mold, after having first lowered its temperature to 300°–420° C. The preferred temperature range for the impregnation treatment is, for example, 300°–370° C., depending on the impregnating pitch used. Due to the force of gravity, the impregnating pitch can easily penetrate into the capillary system formed by the small number of coarse open pores, which was formed during the first coking step. The impregnated molded body is afterwards treated, once again, according to stage 2 of the process for which patent protection is claimed.

According to the process to which the invention relates, the molded coke body is released from the mold by further heating to a temperature at which the coke body shrinks. This shrinking reaches a maximum at approximately 800° C. This temperature must accordingly be approached very carefully, to prevent the maximum tensile stresses from being exceeded by the shrinkage stresses which occur. Excessively rapid heating causes radial cracks, which render the molded body unfit for use as an electrode.

To manufacture molded carbon bodies according to the process to which the invention relates, a heating curve is required, as described, which comprises two sections:

The formation of the "green" coke is completed in the first section of the heating curve (stages 1 and 2), which extends up to approximately 550° C.

For $T = a \times \tau^n$ (Temperature T [°C.], and time $\tau$ [hours]), the heating curve advantageously lies between:
50 < a < 150, preferably 80 to 100, and
0.30 < n < 0.70 preferably 0.5 to 0.6, especially when different raw materials are used.

The heating curves can deviate from the function specified above. However, if the heating rate is too rapid, the porosity of the molded body becomes undesirably high, while if the heating is too slow, too small a volumetric gas flow is produced, as a result of which no marked alignment of the crystal occurs.

The second section of the heating curve has a virtually linear trend. The gradient of the linear rise in temperature is a function only of the diameter of the molded body, and is of approximately the following order of magnitude:

$$d = 0.1 \text{ m} \rightarrow (dT/d\tau) \approx 120° \text{ C./d}$$

$$d = 0.2 \text{ m} \rightarrow (dT/d\tau) \approx 30° \text{ C./d}$$

$$d = 0.4 \text{ m} \rightarrow (dT/d\tau) \approx 8° \text{ C./d}$$

$$d = 0.8 \text{ m} \rightarrow (dT/d\tau) \approx 2° \text{ C./d}$$

The discontinuity point occurring between the two heating curves is expediently smoothed out by a transition arc.

The heating rates which are necessary result in manufacturing times which, for molded bodies having large dimensions, are equal to those in the case of the conventional process procedure. In the case of molded bodies with relatively small dimensions, shorter burning times are possible according to the process to which the invention relates.

The invention is explained in more detail with the aid of the examples which follow, without thereby restricting it.

EXAMPLE 1

A cylindrical metal container, with a diameter of 120 mm and a smooth inside surface, is filled with a pitch which was obtained, by distillation, from the pyrolysis residue from the steam-cracking of straight-run gasoline, and which exhibits the following characteristics:
SP(KS): 120° C.
QI: 0.3%

TI: 22%
Ash: —
The heating curve comprises:
20°–550° C.: in 15 hours. Coking phase, with needle texture of the mesophase crystals in the axial direction.
550°–630° C.: in 20 hours.
630°–830° C.: in 50 hours. The shrinkage dimension amounts to 5%.
Cooling-down: in 25 hours A crack-free molded coke body is produced in 110 hours, which can be removed from the mold simply by inverting it. The yield of carbon is 88%. The porosity is 32%. There is a marked needle texture in the axial direction.

The molded coke body can be graphitized in the customary manner.

The meanings of the abbreviations are as follows:
SP (KS) = Softening point (Krämer Sarnow)
QI = Content which is insoluble in quinoline
TI = Content which is insoluble in toluene

EXAMPLE 2

A metal mold, with a diameter of 400 mm, is filled with a distilled hard pitch, prepared from a separated coal tar pitch (SP 160° C.).

The heating curve comprises:
20°–550° C.: in 18 hours. After the heat treatment the molded coke body has a porosity of 35%.
550°–400° C.: in 10 hours. Cooling-down
400° C.: in 6 hours. The porosity of the molded body is reduced by the addition of distilled hard pitch (SP 160° C.) to the upper degassing surface.
400°–550° C.: in 10 hours. The added impregnating pitch is coked, and contains the same axial crystal structures as the material which was coked initially.
550°–630° C.: in 60 hours.
630°–830° C.: in 350 hours.
830°–20° C.: in 100 hours.

In 554 hours, a crack-free molded coke body, with a diameter of 375 mm, is produced, which can be removed from the mold by inverting it. The porosity of the burned molded body is 16%.

The molded body can be graphitized in the customary manner.

EXAMPLE 3

A cylindrical metal mold, with a diameter of 630 mm, is filled, in a 1:1 ratio, with a filtered standard coal tar pitch, and a residue oil from the ethylene pyrolysis process (SP approx. 40° C.).

The heating curve comprises:
20°–530° C.: in 24 hours.
530°–350° C.: in 15 hours.
350° C.: in 10 hours. First: Impregnation with a filtered standard coal tar pitch (SP 72° C.).
350°–530° C.: in 15 hours.
530°–350° C.: in 15 hours.
350° C.: in 10 hours. Second: Impregnation with a filtered standard coal tar pitch.
350°–530° C.: in 18 hours.
530°–630° C.: in 120 hours.
630°–830° C.: in 1900 hours.
830°–20° C.: in 200 hours.

In 2327 hours, a molded coke body is produced, with a diameter of 600 mm. The porosity is 13%.

The molded body can be graphitized by the customary method.

The tables which follow are intended to display the advantages of the process to which the invention relates, compared to the conventional technique, using the manufacture of electrodes as an example.

Comparison of processes:

| Process stage | Conventional technology | Process according to the invention |
|---|---|---|
| Coke production | Direct-conversion process: coking cool coke discharge coke pre-crush coke calcine coke | dispensed with |
| Produce "green" molded bodies | crush and classify calcined coke establish desired particle size distribution and mix in pitch binder mold "green" bodies | dispensed with |
|  |  | prepare metal mold and fill with solid or liquid starting material |
| Burning | 1st burning process (approx. 4 weeks) 1st vacuum/pressure impregnation (Pitch SP 50–70° C.) 2nd burning process (approx. 2 weeks) | 1st coking (approx. 1 day) 1st impregnation (Pitch SP 120–170° C.) 2nd coking (approx. 0.5 day) Firing process (approx. 850° C.) |
|  | Clean residues from the surface 2nd vacuum/pressure impregnation 3rd burning process (approx. 2 weeks) | dispensed with |
|  |  | removed from the mold |
| Graphitizing |  | Heating-up is accelerated, due to the low electrical resistance accompany the high degree of orientation of the polycrystalline coke body |
| Machining | identical |  |

| Advantages of the Process According to the Invention | |
|---|---|
| Conventional technology Disadvantages: | Process according to the invention Advantages: |
|  | The entire DC-process is dispensed with. |
| The molded body contains a large proportion of closed, inaccessible pores which cannot be impregnated. | The molded body has a continuous pore system in the direction of the rising gas bubbles, formed by a small number of large pores. |
| The pore structure is very irregular, so that it is necessary to use very fluid impregnating pitches having low viscosities, and to carry out the impregnation under pressure. | The uniform coarse pore structure, with smooth pore walls, permits the use of impregnating pitches having a high softening point, and hence a high coking residue. |
| Residues must be removed from | The cleaning operation is |

-continued

| Advantages of the Process According to the Invention | |
|---|---|
| Conventional technology Disadvantages: | Process according to the invention Advantages: |
| the surface after each impregnation step. | dispensed with. |
| The molded body is always cooled to ambient temperature between the firing stages. | The temperature changes required for the impregnating treatment amount to only approximately 200° C. |

| COMPARISON OF THE ELECTRODE CHARACTISTICS | | |
|---|---|---|
| | Conventional technology | Process according to the invention |
| Optical characteristics | The electrodes are anisotropic on the microscopic scale, and are isotropic to weakly anisotropic on the macroscopic scale | Axial alignment of the crystal is present on the microscopic scale<br><br>On the macroscopic scale, a highly anisotropic carbon body results |
| Physical characteristics | | |
| Thermal conductivity | | |
| ∥ | $0.5 \times 10^{-6}$ | $1 \times 10^{-6}$ |
| ⊥ | $2.4 \times 10^{-6}$ | $2.5 \times 10^{-6}$ |
| el. resistance | | |
| ∥ $\delta(\Omega\ \mu m)$ | 11 | 3.3 |
| ⊥ | 11 | 20 |
| Apparent density | 1.57 | 1.56 |
| Flexional strength | | |
| ∥ | 8 N/mm² | 15 N/mm² |
| ⊥ | 4 N/mm² | 4 N/mm² |
| Compressive strength | | |
| ∥ | 14 N/mm² | 20 N/mm² |
| ⊥ | 15 N/mm² | 15 N/mm² |

We claim:

1. A process for the manufacture of an anisotropic molded carbon body having a diameter (d) from high-boiling aromatic hydrocarbon fractions derived from coal or mineral oil and having a high coking residue, without an additional binding agent and without using high pressures, comprising
    filling a mold in the shape of the desired molded carbon body having a diameter of at least 0.1 m with at least one hydrocarbon fraction having a softening point in excess of 40° C. (Krämer Sarnow), said hydrocarbon fraction being in the liquid state or solid state,
    and heating said fraction without pressure up to 550° C., in a first heating stage until said hydrocarbon is completely converted from the liquid into the solidified stage whereby the crystal structure is oriented by the shear forces of the rising gas bubbles and a needle-like structure is built up,
    heating in a second heating stage up to approximately 800° C., at a linear heating rate of approximately $$1.2 \times (1/d^2)°K./day$$

which is a function of the diameter d in meters of the molded body,
    and burning the molded body at a temperature of not less than 850° C.,
    removing said body from the mold and graphitizing said molded body.
2. The process as claimed in claim 1, wherein distillation residues derived from coal tar or highly aromatic pyrolysis residues from the steam-cracking of mineral oil fractions are used as hydrocarbon fractions.
3. The process as claimed in claim 2, wherein the distillation residues have a softening point in excess of 100° C. (Krämer Sarnow) and a content of constituents which do not dissolve in quinoline which does not exceed 1%.
4. The process as claimed in claims 1 or 2, wherein the molds are manufactured with a shrinkage dimension of approximately 5%.
5. The process as claimed in claims 1 or 2, wherein the first heating stage up to 550° C. is carried out at a rate as determined by a heating curve defined by the function:

$$T = a \times \tau^n,$$

in which T denotes the temperature in °C. and $\tau$ denotes the time in hours, and a is in the range from 50 to 150, and n is in the range from 0.3 to 0.7.
6. The process as claimed in claims 1 or 2, wherein the molded body is impregnated, at 300° to 420° C., with a pitch which has a softening point (KS) of 120° to 170° C., in that the heated, molten pitch is poured into the upper, open part of the mold, and penetrates into the molded body solely under the action of gravity.
7. The product produced by the process of claim 1.
8. The product produced by the process of claim 6.
9. The process as claimed in claim 1, wherein the first heating stage is completed in the temperature range up to 550° C. as determined by a heating curve represented by the formula $$T = a \times \tau^n$$

wherein T is temperature in °C., $\tau$ is time in hours and a ranges from 80 to 100 and n is from 0.5 to 0.6.
10. The process of claim 1 further comprising impregnating the molded body with pitch prior to burning.
11. A process for the manufacture of an anisotropic molded carbon body having a diameter (d) from high-boiling aromatic hydrocarbon fractions derived from coal or mineral oil and having a high coking residue, without an additional binding agent and without using high pressures, comprising
    filling a mold with at least one hydrocarbon fraction having a softening point in excess of 40° C. (Krämer Sarnow), said hydrocarbon fraction being in the liquid state or the milled state,
    and heating said fraction without pressure up to 550° C. in a first heating stage, said first heating stage being carried out by
    heating to the temperature below 550° C. at which the formation of the mesophase commences, and then
    heating at a higher temperature up to 550° C. to produce anisotropically deformable liquid crystals from the isotropic molten pitch, the liquid crystals being mesophase
    and in a second heating stage
    rapidly raising the temperature up to about 800° C., at a linear heating rate of approximately $$1.2 \times (1/d^2) \text{°K./day}$$

which is a function of the diameter d in meters of the molded body,
to solidify the mesophase thereby forming green coke,
permitting any gaseous products that were formed in the heating the escape as vapor through the anisotropic mesophase while said mesophase is gradually solidifying,
said escaping vapor forming a needlelike texture in the mesophase and
burning the molded body at a temperature of not less than 850° C.,
removing said body from the mold
and graphitizing said molded body.

* * * * *